(12) United States Patent
Yamashita

(10) Patent No.: US 6,176,634 B1
(45) Date of Patent: Jan. 23, 2001

(54) MACHINE PLATE FASTENING MEANS FOR OFFSET PRESS AND JOINT PLATE FOR FIXING SAID FASTENING MEANS

(75) Inventor: Miyuki Yamashita, Tokyo (JP)

(73) Assignee: Hirakawa Kogyo Sha Co., Ltd., Tokyo (JP)

( * ) Notice: Under 35 U.S.C. 154(b), the term of this patent shall be extended for 0 days.

(21) Appl. No.: 09/175,470

(22) Filed: Oct. 20, 1998

(30) Foreign Application Priority Data

Oct. 21, 1997 (JP) ................................. 9-306633

(51) Int. Cl.$^7$ ........................................ B41F 1/28
(52) U.S. Cl. .................. 403/11; 403/13; 403/315; 403/329; 101/415.1; 101/383
(58) Field of Search ................ 403/11, 13, 326, 403/329, 327, 364, 319, 315; 101/415.1, 382.1, 383

(56) References Cited

U.S. PATENT DOCUMENTS

| | | | |
|---|---|---|---|
| 1,379,936 | * 5/1921 | Quiggan | 101/415.1 |
| 2,507,279 | * 5/1950 | Smulski | 403/329 X |
| 3,626,848 | * 12/1971 | Tafel et al. | 101/415.1 |
| 5,375,520 | * 12/1994 | Kobler et al. | 101/415.1 |
| 5,526,746 | * 6/1996 | Capdeboscq | 101/415.1 |
| 5,715,752 | * 2/1998 | Rother et al. | 101/415.1 |

FOREIGN PATENT DOCUMENTS

| | | |
|---|---|---|
| 0 387 397 | 10/1990 | (EP) . |
| 0 872 343 | 9/1998 | (EP) . |

OTHER PUBLICATIONS

Patent Abstracts of Japan, Publication No. 03093546, Apr. 18, 1991, all dates 1900.
Patent Abstracts of Japan, Publication No. 08039779, Feb. 13, 1996, all dates 1900.

* cited by examiner

*Primary Examiner*—Lynne H. Browne
*Assistant Examiner*—John R. Cottingham
(74) *Attorney, Agent, or Firm*—Millen White Zelano & Branigan

(57) ABSTRACT

A device for fastening a machine plate in an offset press is disclosed. The machine plate fastening device may be gripped by a plate lock-up device on the offset press. The device has a plate and a leaf spring, the plate having fastening pins and the leaf spring holding the machine plate on the pins. The leaf spring has holes corresponding to the fastening pins. Also disclosed is a joint plate which can be attached to fix the fastening device at an appropriate angle on the offset press.

18 Claims, 7 Drawing Sheets

(a)

(b)

MACHINE PLATE FASTENING MEANS FOR OFFSET PRESS AND JOINT PLATE FOR FIXING SAID FASTENING MEANS

FIELD OF THE INVENTION

The present invention relates to a machine plate fastening means for simply mounting a machine plate in an offset press and, more particularly, to a machine plate fastening means that can be attached in a condition that it is gripped by a plate lock-up device originally installed in a conventional offset press and does not require the offset press to undergo any new processing at the time of attaching.

BACKGROUND OF THE INVENTION

As a press plate for offset printing, not only a presensitized plate using an aluminum plate as a substrate (hereinafter referred to as "a PS plate") but also a paper plate using a paper substrate and a film plate using a plastic film as a substrate have been prevailingly used. In particular, the use of a low-priced paper or film plate has markedly increased in frequency because of a recent tendency to diversify the purpose of printing and require a small number of copies in printing. Under these circumstances, reduction in time required for replacement work of machine plates has become a great problem.

For instance, in a case where the printing of a small number of copies, such as 300 copies, was performed in the past, the time taken from the start to the finish of printing was about 5 minutes, while the replacement work of machine plates took at least 5 minutes. In other words, it occurred in some cases that the time for attaching a machine plate was longer than a net printing time. Therefore, many devices which enable reduction in working time for replacement of machine plates have been proposed in recent years. For instance, such devices are disclosed in Tokkai Sho 59-1262, Tokkai Hei 3-93546, Tokkai Hei 6-328669, Tokkai Hei 8-39779 (The term "Tokkai" as used herein means an "unexamined published Japanese patent application"), Jikkai Hei 3-19037, Jikkai Hei 3-45133, Jikkai Hei 3-45134 (The term "Jikkai" as used herein means an "unexamined published Japanese utility model application"), and Jikko Hei 6-11782 (The term "Jikko" as used herein means an "examined Japanese utility model publication").

Each of those devices requires a plate cylinder or/and a plate lock-up device to undergo certain direct processing. However, it is difficult to perform accurate processing at the job site. In attaching such a device to a printing machine which has already been in operation, therefore, it is necessary to detach the parts to be worked from the printing machine and process them with a NC machine in order to secure printing accuracy; as a result, the operations at the job site increases in complexity.

SUMMARY OF THE INVENTION

Therefore, a first object of the present invention is to provide a machine plate fastening means that can be fixed in an offset printing machine at the job site without requiring the printing machine to undergo any processing and enables a paper or film machine plate to be easily attached to and detached from a press cylinder.

A second object of the present invention is to provide a joint plate which can be attached to the aforesaid fastening means when it is required for fixing the fastening means in an offset printing machine at an angle properly adjusted depending on the printing machine.

The above-described objects are attained with a machine plate fastening means for an offset press: which is attached to the offset press in a condition that one end of the means is gripped by a plate lock-up device fitted in the cut-off part of a plate cylinder for the offset printing, and comprises (i) a lower plate having the back part to be gripped by the plate lock-up device, the middle part over which a machine plate is fastened by putting fastening pins in fastening holes punched therein and the front part for introducing the insertion of the machine plate, (ii) a leaf spring for pressing a machine plate inserted and fastened by the fastening pins at the fastening holes which has a bent form and a hole or holes corresponding to the fastening pin or pins and enabling the fastening pin head to go therethrough, and (iii) an upper plate laid on the lower plate and united in the back part of the lower plate; wherein, when the upper plate is arranged only on the back part of the lower plate, the fastening pins are fixed to the middle part of the lower plate so as to project into the space above the lower plate and the leaf spring is held between the upper plate and the lower plate, or when the upper plate is bent into a step and the front part thereof extends over the middle part of the lower plate so as to form a space for fastening the machine plate inserted, the fastening pins are fixed to the middle part of the lower plate or the front part of the upper plate so as to project into the space between the upper plate and the lower plate: and with a joint plate bent in a deformed S-shape which is fixed to the aforesaid fastening means when it is required for attaching to the plate cylinder at a proper angle.

The machine plate fastening means according to the present invention has a great advantage in that no processing is required for an offset press at the time of attaching the fastening means to the offset press. In a special case where a machine plate fastening means is designed so as to have a length slightly shorter than the length of a plate lock-up device originally installed in an offset press, the fastening pins can be fitted in the intended positions with ease and with high accuracy by the use of a NC processing machine; as a result, the present machine plate fastening means can sufficiently answer strict requirements for the registration of machine plates in color printing. Moreover, in accordance with the embodiments of the present invention, the machine plate fastening means can be attached to any types of offset press, so the efficiency in replacement work of machine plates can be significantly heightened.

Figure 1:
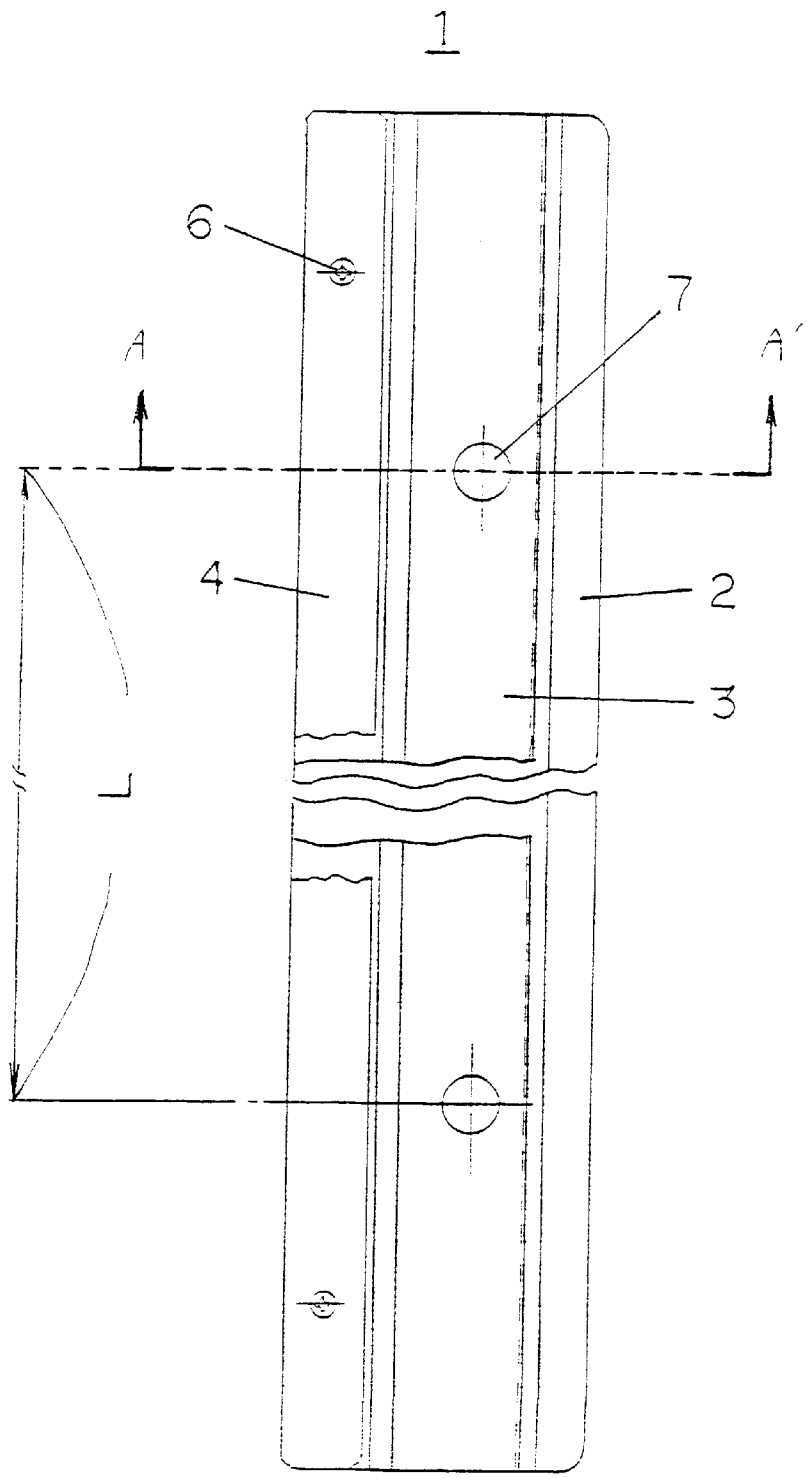
FIG. 1 is a ground plan of a machine plate fastening means according to a first embodiment of the present invention, the total length of which is slightly shorter than the length of a plate lock-up device originally installed in an offset press.

In those figures, the numeral 1 denotes a machine plate fastening means according to the present invention, the numeral 2 denotes a lower plate, the numeral symbol 2-1 denotes the back part of a lower plate, the numeral symbol 2-2 denotes the middle part of a lower plate, the numeral symbol 2-3 denotes the front part of a lower plate, the numeral 3 denotes a leaf spring, the numeral symbol 3-1 denotes the machine plate pressing part of a leaf spring, the numeral symbol 3-2 denotes the bent part of a leaf springs the numeral 4 denotes an upper plate, the numeral 5 denotes a fastening pin, the numeral symbol 5-1 denotes the slope part of a fastening pin, the numeral symbol 5-2 denotes the smoothly planed side face of a fastening pin, the numeral symbol 5-3 denotes the taper part of a fastening pin, the numeral 6 denotes a flat head bolt, the numeral 7 denotes a hole for confirmation, the numeral 8 denotes a hollow, 10 denotes a joint plate, the numeral 20 denotes a plate cylinder, the numeral 21 denotes the clamp plate of a plate lock-up device, the numeral 22 denotes the stand of a plate lock-up device, 23 denotes a PS plate, and 24 denotes an adhesive double coated sheet.

DETAILED DESCRIPTION OF THE INVENTION

The present invention is illustrated below by drawings, but the invention should not be construed as being limited to the embodiments shown in those drawings.

Figure 2:
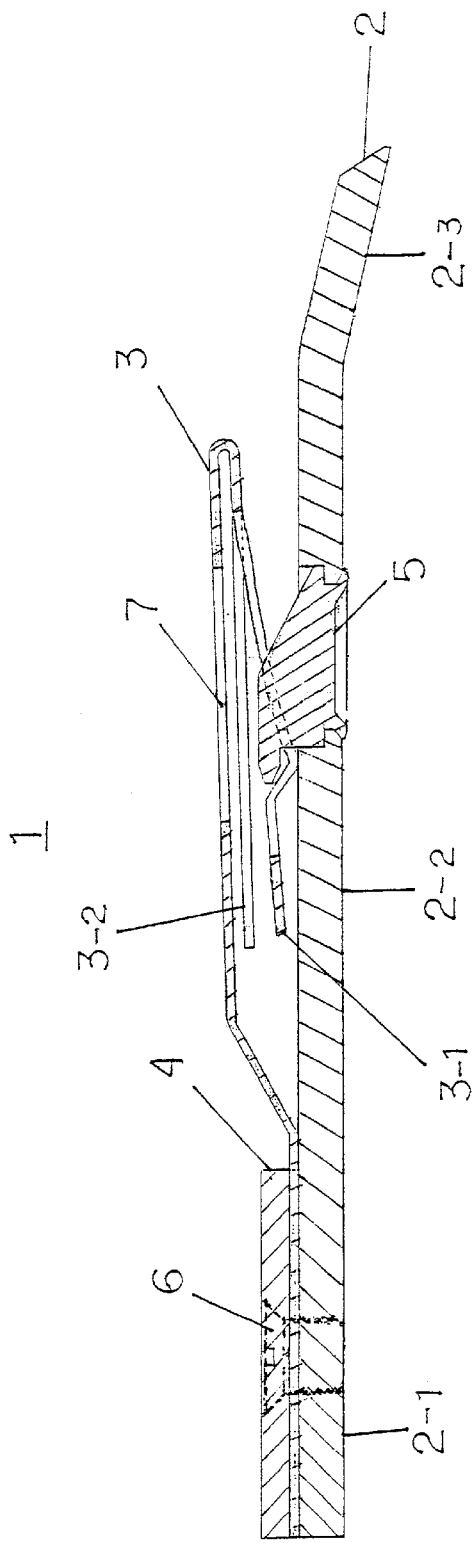
FIG. 2 is a sectional plan of the machine plate fastening means of FIG. 1, which is cut by the A-A' plane shown in FIG. 1 and drawn on a magnified scale for showing the details of the fastening means.
Figure 3:
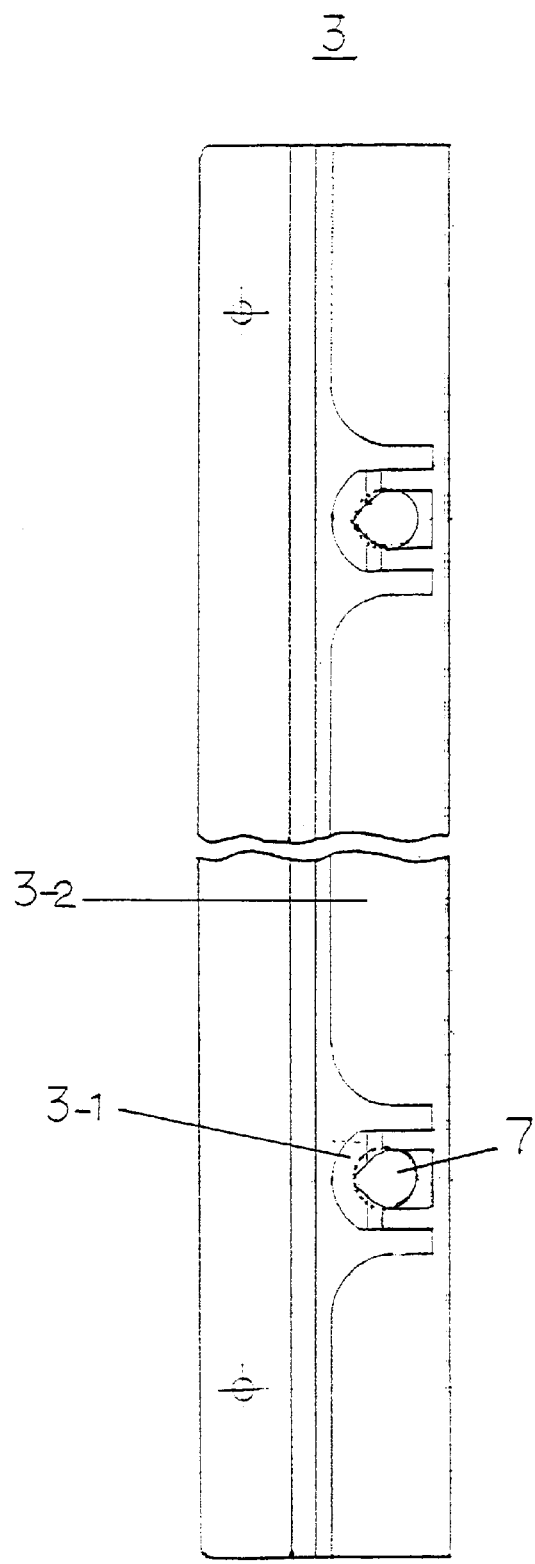
FIG. 3 is a bottom plan of a leaf spring shown in FIG. 1.

FIG. 1 is a ground plan of a machine plate fastening means according to a first embodiment of the present invention, FIGS. 2 is a magnified sectional plan cut by the A-A' plane shown in FIG. 1, and FIG. 3 is a bottom plan of a leaf spring. In these plans, the numeral 1 denotes a machine plate fastening means according to the present invention, the numeral 2 denotes a lower plate, the numeral 3 is a leaf spring, the numeral 4 is an upper plate, the numeral 5 is a machine plate fastening pin, the numeral 6 is a fiat head bolt, and the numeral 7 is a hole for confirming the fit between a fastening pin and a fastening hole made in a machine plate.

Further, the numeral symbol 2-1 denotes the back part of a lower plate, on which an upper plate is arranged so that these plates are united; the numeral symbol 2-2 denotes the middle part of a lower plate, over which a machine plate is held; the numeral symbol 2-3 denotes the front part of a lower plate, which is curved downward so as to ensure the smooth insertion of a machine plate; the numeral symbol 3-1 denotes the machine plate pressing part of a leaf springs which presses a machine plate inserted and caught by the fastening pins 5 so that the machine plate is prevented from slipping off the fastening pins; and the numeral symbol 3-2 denotes the bent part of a leaf spring.

Additionally, the lower plate can be curved downward at the middle part, if needed f or the smooth insertion of a machine plate.

The leaf spring can be made with ease by stamping out a steel sheet in an intended shape and bending it. The use of a leaf spring having a bent form can protect workers against injury. In the aforementioned embodiment, the leaf spring, the upper plate and the lower plate are designed so as to have the same length and be shorter than the length of a plate lock-up device originally installed in a plate cylinder. In this case, the distance between fastening pins (which is represented by L in FIG. 1) is equal to the distance between fastening holes punched in a machine plate, namely 550 mm in usual cases. Therefore, the lower plate and so on are each required to have a length of no shorter than 560 mm.

Although the leaf spring and the lower plate as illustrated in FIG. 1 (or FIG. 3) have the same length, a leaf spring according to the present invention is not always required to have the same length as the lower plate, but it may be arranged so as to be present only in the neighborhood of each fastening pin, namely so as to cover such a limited area as to be substantially useful for pressing the machine plate caught by the fastening pin to prevent it from sliding off the fastening pin.

Similarly to the leaf spring, an upper plate according to the present invention is not always required to have the same length as the lower plate, but the length required to securely unite a upper plate, a leaf spring and a lower plate in a body in a condition that a leaf spring is put between the upper plate and the lower plate will suffice for the length of the upper plate. In other words, such a length as to ensure the holding of a leaf spring between the upper plate and the lower plate is sufficient for the length of the upper plate. Therefore, two upper plates provided on two leaf springs respectively may be arranged separately so as to correspond to the two fastening pins fixed to the lower plate.

The upper plate, the leaf spring and the lower plate can be easily united in a body by means of at least two bolts. Of course, other uniting means, such as adhesives, may be used independently of bolts, as well as in combination with bolts.

As the upper plate and its corresponding part (the back part 2-1) of the lower plate are gripped by the plate lock-up device, it is required for the bolts not to project out from each plate surface. Practically, the use of flat head bolts, as shown in FIG. 2, suits for such a requirement.

In the present embodiment as mentioned above, it is possible to easily and accurately attach the fastening means to the plate cylinder by putting a mark on the center of the fastening means in the length direction and adjusting this mark to another mark put on the center of the plate cylinder in the length direction. Similarly to the upper plate and the leaf spring, it is possible to let the lower plate have such a reduced length as to be arranged only in the neighborhood of a fastening pin. In this case, the present fastening means has only one fastening pin, so that the use of the present fastening means in pairs is required to exercise the function as a fastening means. Therein, it is also required to previously mark at the intended positions of the plate cylinder so as to indicate the places to which the fastening means are to be attached.

Figure 4:
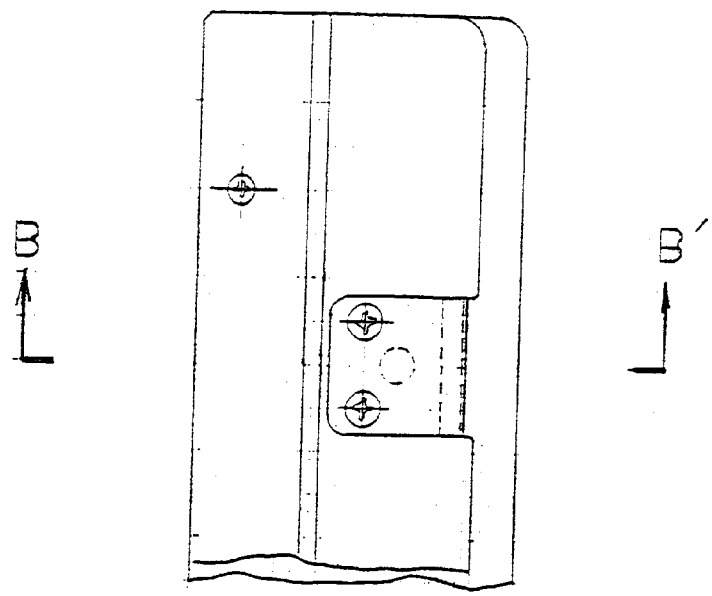
FIG. 4 shows a ground plan of a machine plate fastening means according to a second embodiment of the present invention and a sectional plan thereof cut by B-B' plate, wherein the upper plate is fitted up with leaf springs in limited areas.
Figure 4:
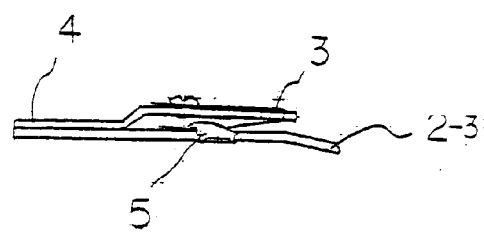
Figure 4:
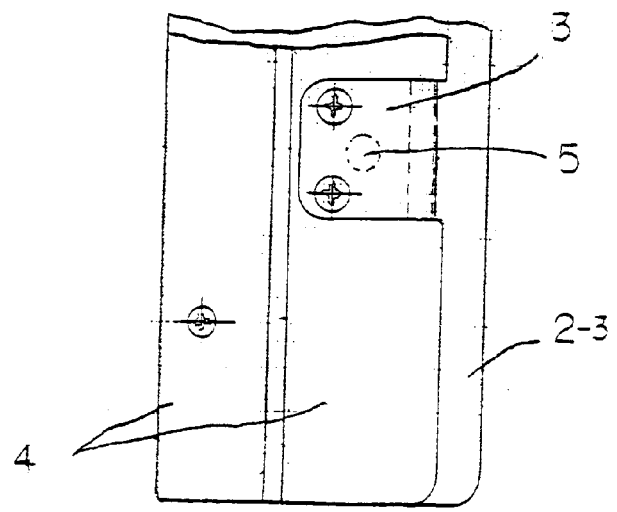

FIG. 4 shows a second embodiment of the present machine plate fastening means. As is apparent from the sectional plan cut by B-B', plane (the middle figure), the upper plate 4 is extended to the position from which the leaf spring is folded back, in contrast to the first embodiment. As is also apparent from the ground plan (the upper and lower figures), each leaf spring is fitted to the upper plate with two bolts arranged above a fastening pin and on either side thereof. In this embodiment, as shown in the upper and lower figures, the leaf spring is folded back from the cut-off part formed at the forefront of the upper plate, and inserted between the upper plate and the lower plate. However, these cut-off parts are not always required.

In this embodiment also, the length (in the length direction of a plate cylinder) of the upper plate and that of the lower plate can be changed properly. Either the upper plate or the lower plate, or both of them can be designed so as to have a desired length, provided that the length desired is longer than that of the leaf spring. From the viewpoint of easiness in handling, however, each of those plates naturally has its length limit. In a case where those plates are used in pairs for fastening a machine plate, it is desirable for each plate to have such a length as to enable the use on either side. Further, it is desired that the front part 2-3 of the lower plate be bent downward in order to enable an easy insertion of a machine plate.

Figure 5:
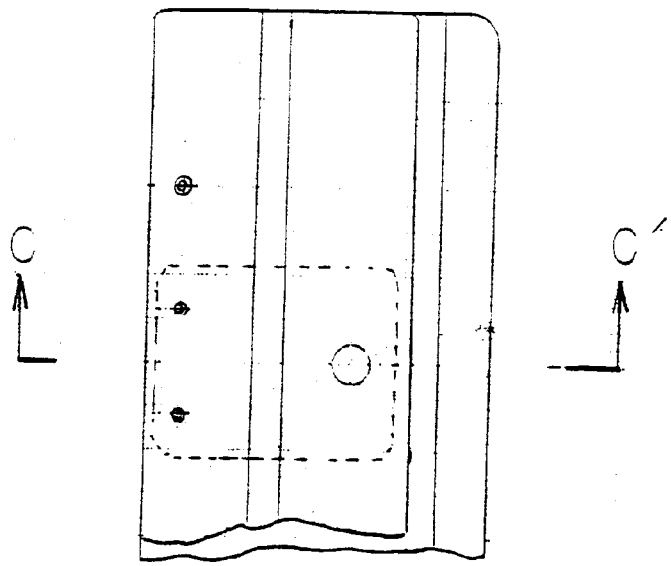
FIG. 5 shows a ground plan of a machine plate fastening means according to a fourth embodiment of the present invention wherein fastening pins are fixed to the upper plate, and a sectional view thereof cut by the C-C' plane.
Figure 5:
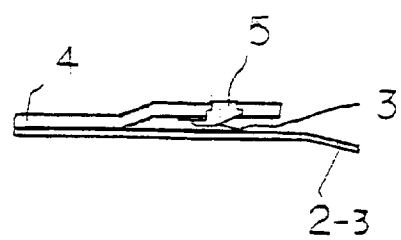
Figure 5:
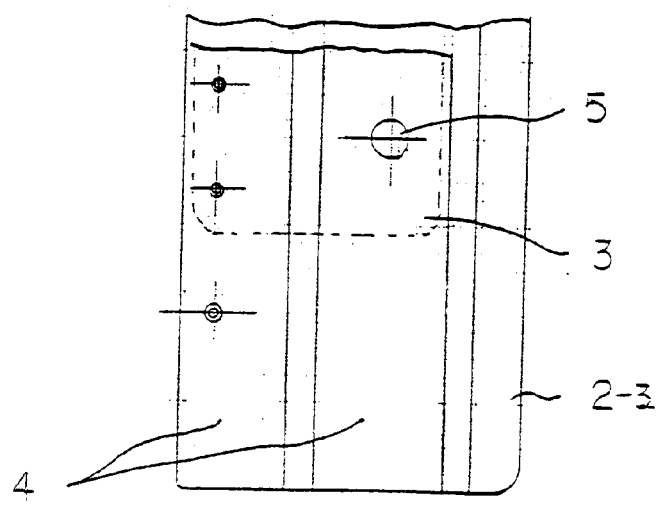

FIG. 5 shows a third embodiment of the present machine plate fastening means, in this embodiment, the plate to which machine plate fastening pins are fixed is not the lower plate but the upper plate, in contrast to the foregoing two embodiments. The leaf spring is arranged between the upper plate and the lower plate and held in the united part of those plates with bolts. Similarly to the second embodiment, however, the leaf spring can be fitted to the under side of the lower plate with bolts and bent upwards so as to be inserted between the upper plate and the lower plate.

Also, the upper plate and the lower plate each can be designed so as to have a proper length, similarly to the first and the second embodiments.

In addition, although the upper plate is bent into a step in FIG. 4 and FIG. 5, it may be straight so far as the space for insertion of a machine plate can be secured by, e.g., putting a spacer (not shown) between the lower plate and the upper plate in the back part, or/and bending downward the lower plate in the middle part or properly designing the upper part of the lower plate.

Figure 6:
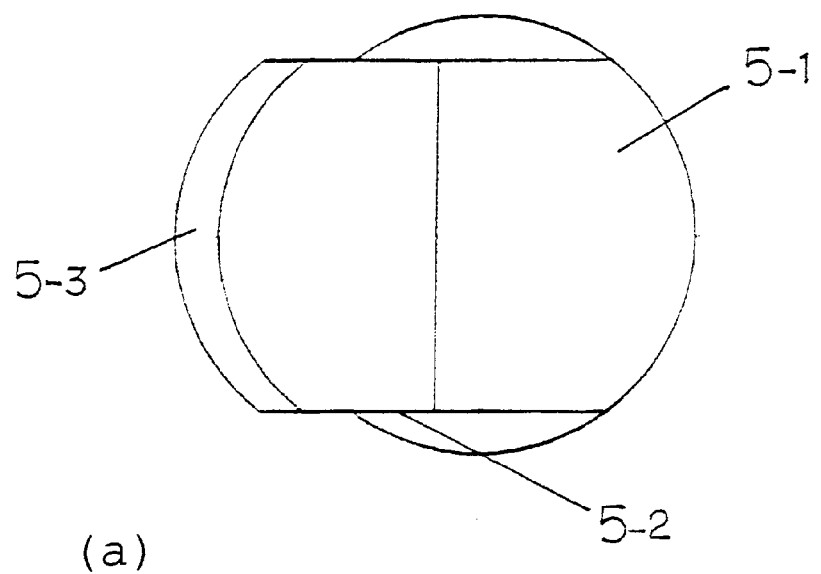
FIG. 6 shows a ground plan (a) and a side view (b) of a desirable fastening pin fixed to a machine plate fastening means according to the present invention.
Figure 6:
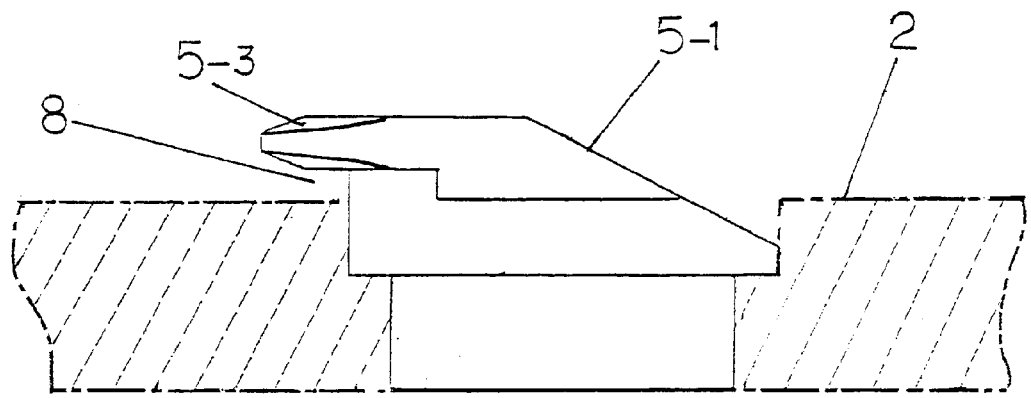

The present invention has no particular restrictions as to the shape of machine plate fastening pins, and so the fastening pins fixed to the present fastening means may have any known shapes. However, the shape shown in FIG. 6 is particularly preferred as the shape of the fastening pins used in the present invention. More specifically, FIG. 6(a) is a ground plan of the head part of a fastening pin, and FIG. 6(b) is a side view of a fastening pin in a state that the pin is fixed in the lower plate. In these figures, the numeral symbol 5-1 denotes the slope part formed by cutting a fore part of the pin head in order to make the insertion of a machine plate easy, the numeral symbol 5-2 denotes the smoothly planed side face of a fastening pin, the numeral symbol 5-3 denotes the taper part which is formed at the end of a back part of the pin head so that the machine plate once fastened may be easily detached by being pushed laterally, and the numeral 8 denotes a hollow formed so as to prevent the fastened machine plate from coming off the fastening pins.

The fastening pin having the head as mentioned above can be easily made with high accuracy by the combined use of turning and milling machines.

Additionally, the position adjustment of the fastened machine plate in the length direction of the plate lock-up device can be made easily by cutting each pin side (5-2) so as to have smooth vertical plane. This cutting can produce great effect on the registration of a paper plate because it can soak up the expansion of a paper plate to prevent the wrinkle generation. Further, although the upper surface of the back part of the pin head, excepting the taper part, is flat in FIG. 6(b), it is not necessarily flat but may be convex. Each fastening pin can be fixed to the upper plate or the lower plate by use of any known means, such as caulking or riveting. Additionally, FIG. 6(b) has the lines drawn in the inner part of the fastening pin. These lines, other than those showing the taper part, appear in the making process of the fastening pin, but they have no influence on the outer shape.

Figure 7:
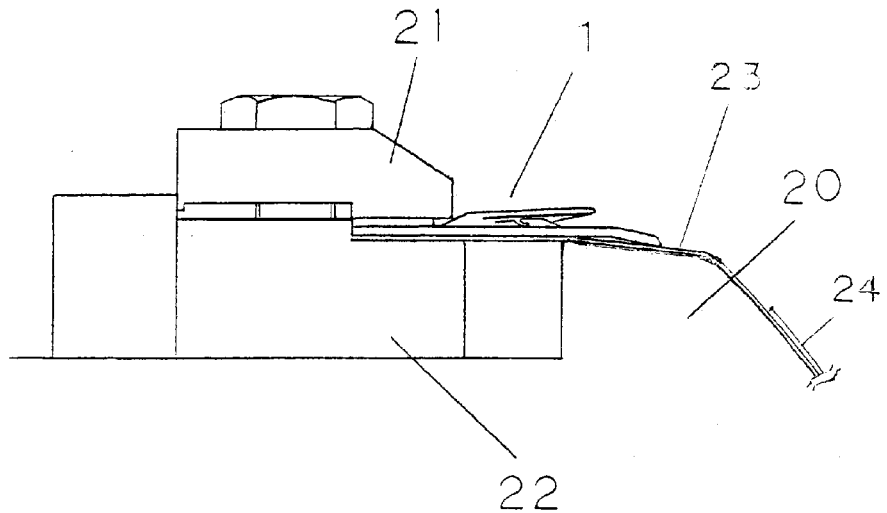
FIG. 7 is a schematic sectional View showing a state where the present machine plate fastening means is gripped by the plate lock-up device.

FIGS. 7 shows a fixed state of a machine plate fastening means according to the present invention, wherein the fastening means is held between the clamp plate 21 and the stand of a plate lock-up device originally installed in a plate cylinder 20. The machine plate is attached to the plate cylinder as follows: First, an adhesive double coated sheet having high adhesiveness on one side and low adhesiveness on the other side is applied on its high adhesiveness side to the back side of a disused PS plate 23 or the like. Then, one end of the resulting PS plate or the like is gripped by the plate lock-up device placed on the head side of the plate cylinder with the adhesive sheet facing upward and, at the same time, the present machine plate fastening means is (are) inserted in the plate lock-up device at the intended position(s). Further, the other end of the PS plate is gripped by the other plate lock-up device placed on the tail side, thereby mounting the disused PS plate or the like on the plate cylinder.

In attaching a machine plate, the fastening pins 5 fitted in the present fastening means are inserted into their corresponding fastening holes previously formed in the machine plate with high accuracy, and the plate cylinder is turned so as to paste up the machine plate on the low adhesiveness side of the adhesive sheet applied to the back side of the disused PS plate or the like. In the replacement of machine plates, the machine plate attached is peeled from the adhesive double coated sheet and the fastening holes are released from the fastening pins, and then a new machine plate is attached in the aforementioned way. This replacement work takes about 1 minute. Additionally, the adhesive sheet used is designed so as to have lower adhesiveness on the machine plate applied side than the PS plate applied side, so that the adhesive sheet itself does not peel off the PS plate upon the removal of a machine plate.

Figure 8:
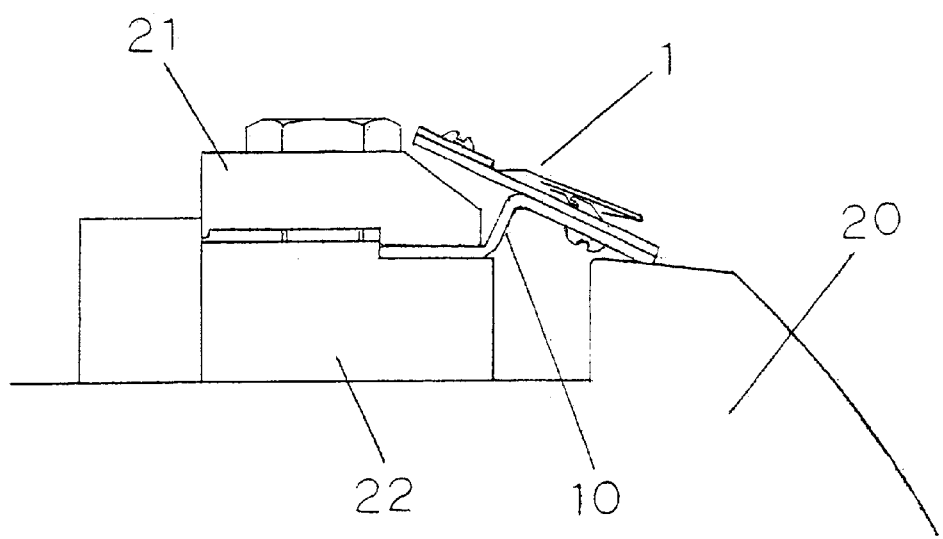
FIG. 8 is a schematic sectional view showing a state where the present machine plate fastening means is gripped by the plate lock-up device via a joint plate according to the present invention.

FIG. 8 shows another fixed state of a machine plate fastening means according to the present invention, wherein the fastening means is fixed to one face of a joint plate 10 according to the present invention, which has a deformed S-shape in the side view, and the other part of the joint plate is gripped by the plate lock-up device. In this embodiment, it is not required to use flat head bolts for uniting the upper plate, (the leaf spring) and the lower plate in a body, but ordinary bolts can be used, as shown in the drawing. AS the spaces allowed for attaching the present fastening means differ among printing machines of various types, the present joint plate is a great convenience for adaptation of the present fastening means to various types of printing machines. Additionally, the PS plate mounted on the plate cylinder is omitted from the FIG. 8.

What is claimed is:

1. A machine plate fastener for an offset press, comprising:

a plate cylinder having a cut-off part and a plate lock-up device in the cut-off part;

a plate grippable by the plate lock-up device, said plate having a fastening pin or fastening pins protruding therefrom, and a leaf spring attached thereto having a hole or holes corresponding to the fastening pin or fastening pins and allowing the fastening pin or fastening pins to go therethrough, wherein the plate has a length shorter than the plate lock-up device; and a machine plate having a fastening hole or fastening holes corresponding to the fastening pins, whereby the machine plate is pressed against the plate by the leaf spring and fastened by the fastening pins.

2. A machine plate fastening means according to claim 1, wherein the plate has a bilateral pair of fastening pins arranged symmetrically lengthwise about the center of the plate lock-up device.

3. A machine plate fastener according to claim 1, wherein the plate comprises an upper plate and a lower plate, and a portion of the upper plate extends over the lower plate to form a space for inserting the machine plate, and the leaf spring is held between the upper plate and the lower plate.

4. A machine plate fastener according to claim 1, wherein the plate comprises an upper plate and a lower plate and a front part of the upper plate extends over a middle part of the lower plate so as to form a space for inserting the machine plate, and the leaf spring is fitted to the upper plate or the lower plate and bent so as to be inserted between the upper plate and the lower plate.

5. A machine plate fastener according to claim 1, wherein part of the plate is curved downward to enable the smooth insertion of a machine plate.

6. A machine plate fastener according to claim 1, wherein the middle part of the plate is curved downward to enable the smooth insertion of a machine plate.

7. A machine plate fastener according to claim 1, wherein at least one fastening pin has a head formed with a slope.

8. A machine plate fastener according to claim 7, wherein the at least one fastening pin is a pin each lateral of which is cut so as to be a smooth vertical plane.

9. A machine plate fastener according to claim 7, wherein the head has a tapered shape to enable easy movement of the machine plate once fastened in lateral directions.

10. A machine plate fastener according to claim 1, wherein the plate comprises an upper plate and a lower plate, and the upper plate, the leaf spring and the lower plate are united in a body with at least two flat head bolts.

11. A joint plate for fixing a machine plate fastening means at a proper angle to a plate cylinder of an offset press comprising:

a plate cylinder having a cut-off part and a plate lock-up device in the cut-off part, a joint plate having an angle, and having a first flat part grippable by the plate lock-up device and a second flat part;

a plate connected to said second flat portion, said plate having a fastening pin or fastening pins protruding therefrom, and a leaf spring having a hole or holes corresponding to the fastening pin or fastening pins and allowing the fastening pin or fastening pins to go therethrough, and a machine plate having a fastening hole or fastening holes corresponding to the fastening pins, whereby the machine plate is pressed against the plate and fastened by the fastening pins and held at the angle.

12. A joint plate as claimed in claim 11, wherein the angle comprises a deformed S shape when viewed from a side.

13. A machine plate fastener as claimed in claim 1, wherein the plate comprises a lower plate having a back part grippable by the plate lock-up device, a middle part over which a machine plate is fastened by putting fastening pins in fastening holes punched therein, and a front part for introducing the insertion of the machine plate, and an upper plate laid on the lower plate and joined in the back part of the lower plate.

14. A machine plate fastener as claimed in claim 13, wherein the leaf spring is mounted between the upper and lower plates.

15. A machine plate fastener as claimed in claim 13, wherein the upper plate is shaped like a step and extends over the middle part of the lower plate.

16. A machine plate fastener as claimed in claim 15, wherein the leaf spring is attached to the upper plate.

17. A machine plate fastener as claimed in claim 1, wherein the plate comprises an upper plate and a lower plate, and the fastening pin or fastening pins are on the upper plate with the leaf spring pressing upwardly.

18. A machine plate fastener for an offset press, comprising:

a plate cylinder having a cut-off part and a plate lock-up device in the cut-off part;

a plate grippable by the plate lock-up device, said plate having a fastening pin or fastening pins protruding therefrom, and a leaf spring attached thereto having a hole or holes corresponding to the fastening pin or fastening pins and allowing the fastening pin or fastening pins to go therethrough, wherein the plate comprises an upper plate and a lower plate, and the fastening pin or fastening pins are on the upper plate with the leaf spring pressing upwardly; and a machine plate having a fastening hole or fastening holes corresponding to the fastening pins, whereby the machine plate is pressed against the plate by the leaf spring and fastened by the fastening pins.

* * * * *